Nov. 24, 1964

E. F. WARD 3,158,102

COOLING AND SEALING OF ROTARY EQUIPMENT

Filed Feb. 4, 1963

INVENTOR.
ELMER F. WARD
BY
White & Haefliger
ATTORNEYS.

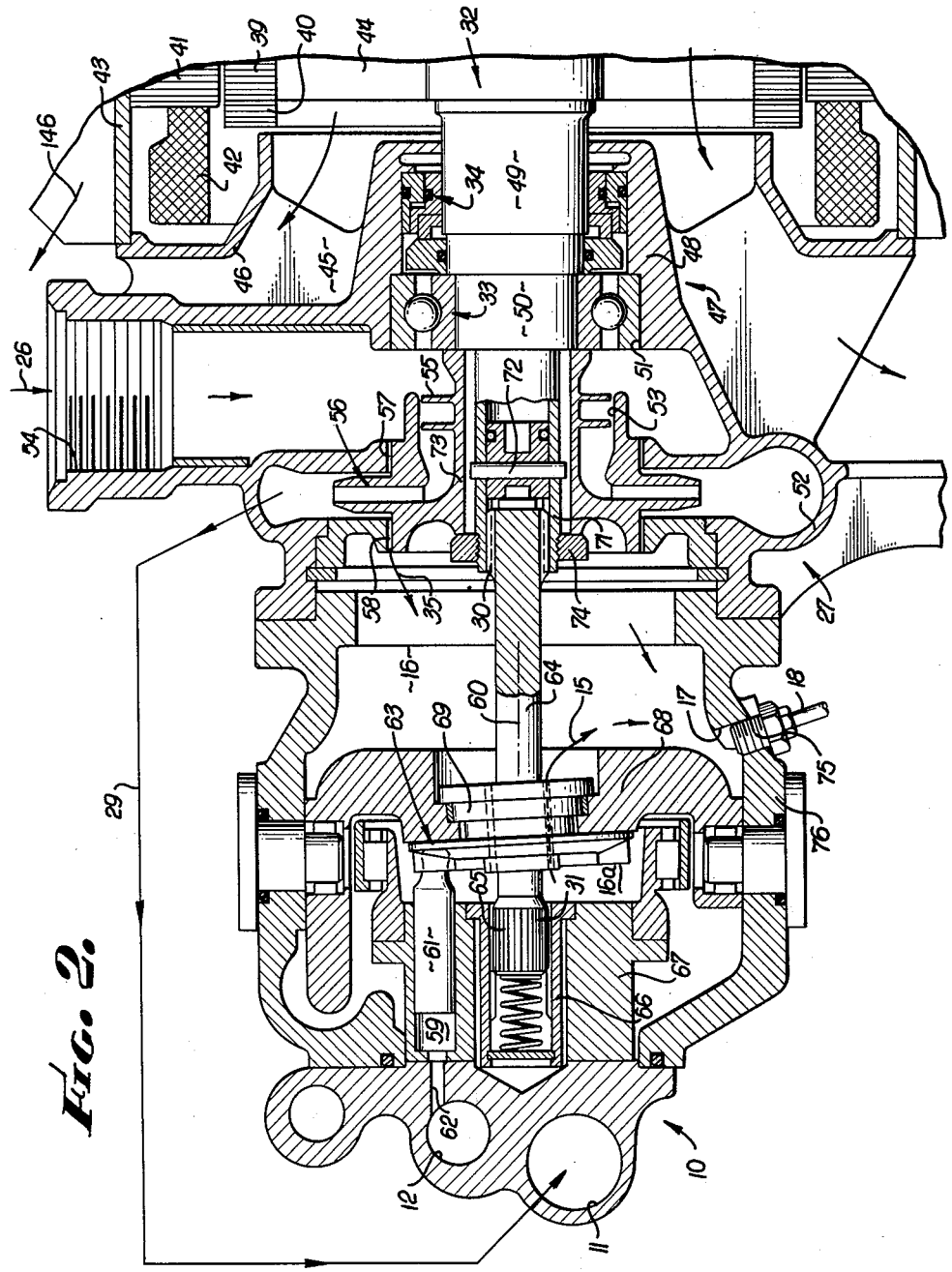

United States Patent Office 3,158,102
Patented Nov. 24, 1964

3,158,102
COOLING AND SEALING OF ROTARY
EQUIPMENT
Elmer F. Ward, Orange, Calif., assignor to Task Corporation, Anaheim, Calif., a corporation of California
Filed Feb. 4, 1963, Ser. No. 255,935
3 Claims. (Cl. 103—5)

This invention relates generally to fluid lubrication, cooling and sealing of rotary equipment, and more particularly has to do with improvements and simplifications in the construction of driving and driven units such as rotary electrical machines and rotary hydraulically working apparatus wherein lubrication and cooling of the drive is required.

Speaking generally with respect to the design and operation of high speed rotary equipment, such as electrical motors driving liquid pumps and the like, certain problems arise in those instances where fluid leakage under pressure, or dirty fluid supplied to the pumping apparatus, has a tendency to gain access to the electrical motor and contaminate it. To obviate this problem, it has generally been thought necessary to provide a seal in or near the pump and between the drive shaft and pump housing to prevent pressure leakage back toward the electrical motor. However, this presents the further problem of providing for adequate lubrication of the drive, as for example where shaft splines may be used between the pump and the motor to accommodate slight misalignment of the drive elements.

The present invention contemplates a solution to these problems in a manner providing for adequate lubrication of the drive, freedom from contamination of the electrical motor by the dirty fluid pressure leakage, and simplification of the general construction, as will be brought out. As broadly considered, the invention contemplates the provision of an assembly including rotary hydraulically working apparatus, and a rotary electrical machine between which power is transferred by a drive, the apparatus characterized as leaking hydraulic fluid toward the space between the apparatus and machine to at least partially satisfy the lubrication requirements of the assembly, together with means for withdrawing hydraulic leakage from said space in such manner as to forestall leakage contamination of the electrical machine. More specifically, the absence of a seal at the hydraulically working apparatus such as a pump provides for the necessary pressure leakage of hydraulic fluid to lubricate the drive in the space between the pump and the electrical machine such as a motor, and a seal may be provided at the pump end of the motor to block access of the leakage fluid to the motor. At the same time, the fluid leaking to the space between the pump and motor for lubrication may be kept from building up pressure to an unwanted level such as would otherwise result in contamination of the motor in spite of the seal, through the drainage of such fluid from said space and return thereof to a suitable sump or reservoir, or other passage, as will be brought out.

The invention also contemplates the incorporation of these principles within a combination that includes first and second pumps connected in series to act as boost and main pumps, both of these being driven by an electrical motor with the boost pump in the space between the main pump and motor. Within this environment the pump may be characterized as leaking hydraulic fluid into said space and toward the electrical machine to at least partially satisfy the lubrication requirements of the assembly, such requirements arising for example, where spline connections are used in the drive. The invention in this instance provides for drainage of the pressure leakage in such manner as to withdraw hydraulic liquid in a direction away from the motor to forestall leakage contamination thereof, as will be described in greater detail.

These and other objects and advantages of the present invention, as well as the details of an illustrative embodiment, will be more fully understood from the following detailed description of the drawings, in which:

FIG. 2 is a side elevation taken in section through an embodiment of a rotary unit incorporating the invention.

Figure 1:
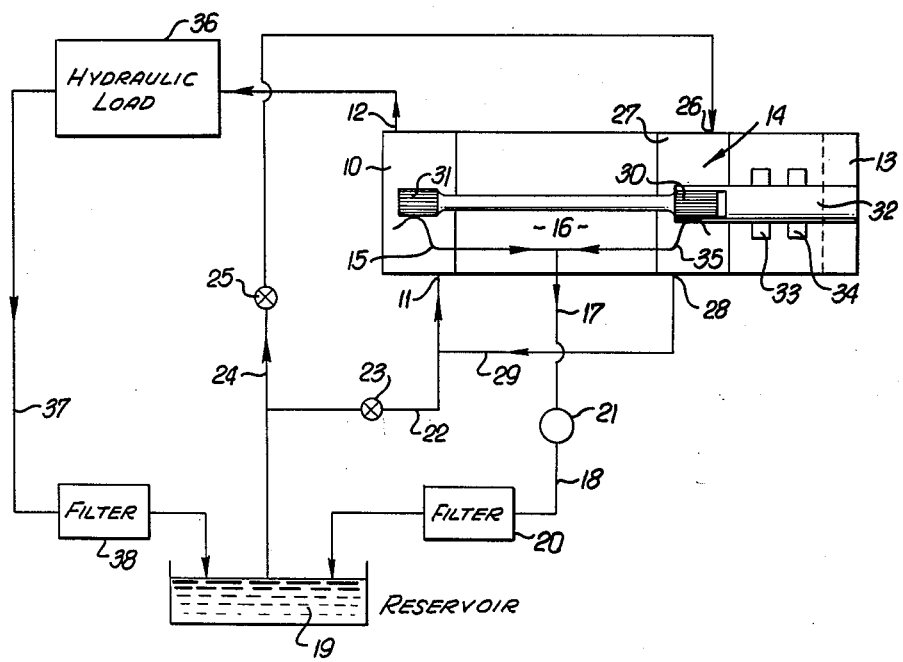
FIG. 1 is a schematic diagram of a system incorporating the invention.

Referring first to FIG. 1, the system is shown to include a hydraulically working apparatus 10 having a fluid inlet 11 and a fluid outlet 12, and a rotary electrical machine 13 spaced from the apparatus 10. Power is transferred between the machine 13 and apparatus 10, or between the apparatus and machine where the latter is the driven element, typically by the drive generally indicated at 14. The apparatus 10 is characterized as leaking typically dirty hydraulic fluid at 15 toward the space between the apparatus 10 and the machine 13, as for cooling or lubrication purposes characterized as running requirements of the assembly. Further, in accordance with the invention, means is provided for withdrawing hydraulic liquid or leakage from the space 16 in such manner as to forestall leakage contamination of the electrical machine, said withdrawal being indicated at 17.

The system shown in FIG. 1 also includes a line 18 for transferring the withdrawn fluid to a reservoir 19, there being a filter 20 in the line and also a valve or pump 21 or other equivalent element for regulating the flow through the line 18, it being understood that the line itself may accomplish this function. In this regard, the pressure in the space 16 may be maintained sufficiently reduced by withdrawal of fluid through the line 18 as to accomplish the running requirements of the assembly, including adequate cooling, lubrication of the drive and the prevention of contamination of the electrical machine.

From the reservoir 19 the fluid may be returned at 22 to the intake 11 as by opening valve 23 in line 22. On the other hand, the fluid may be returned at 24 through a valve 25 to the intake 26 of a boost pump 27. Fluid discharged at 28 by the boost pump is delivered at 29 to the intake 11 of the main pump. Typically, the boost pump 27 is driven by the drive 14, which may include splines 30 and 31 as shown to compensate for misalignment of the drive elements with respect to the driven elements of the boost pump 27 and main pump 10, and with respect to the drive shaft 32 driven by the motor 13. The latter shaft is centered and supported by a bearing 33 between the boost pump and a seal 34 acting to exclude access of pressure liquid to the motor. Since the boost pump intake and delivery pressures are substantially lower than the delivery pressure of the main pump, it is clear that any leakage from the boost pump will be at lower pressure than said main delivery pressure which leaks at 15 toward the space 16. It is also seen that the withdrawal of leakage fluid at 17 tends to prevent excess pressurization of the seal 34 since not only is the leakage 15 being withdrawn but also the leakage 35 from the boost pump is being withdrawn in a direction away from the seal and motor.

The high pressure fluid delivered at 12 by the main pump 10 typically passes to a hydraulic load 36 from which the fluid is returned at 37 through a filter 38 to the reservoir 19.

Turning now to FIG. 2, the elements of FIG. 1 found in FIG. 2 bear the same numbers for easy cross reference. Additional structure includes the motor rotor laminations 39 and end ring 40, suitable bars, not shown, being sunk in the laminations 39 to interconnect the opposite end rings 40, thereby forming the usual squirrel cage construction. Also, the motor includes the stator laminations 41 from which end windings 42 project endwise, these being contained within the motor housing 43. Air circulates through the passages 44 and 45 within the rotor and at the end of the motor over the end bell 46, and also at 146 over the housing, in cooling relation with the machine.

Housing structure is generally indicated at 47 as having a tubular boss portion 48 through which the drive shaft steps 49 and 50 extend. In this connection, it will be understood that the seal 34 packs off between the shaft step 49 and the boss 48, at the boost pump end of the motor, and that leakage from the boost pump is withdrawn generally away from the machine and the packing 34. Also, the bearing 33 is received within bore 51 in the housing boss 48.

The boost pump 27 is shown to include a scroll or volute 52 to the eye 53 of which inlet fluid is delivered, as through the inlet fitting 54. An axial flow inlet impeller is shown at 55 for delivering fluid through the inlet 53 to the centrifugal impeller 56 discharging into the scroll 52. Impeller 55 tends to draw fluid away from the bearing 33 and the seal 34 and particularly any fluid leaking back to the inlet through the clearances including the clearance 57 between the centrifugal impeller and the scroll. Clearance is also shown at 58 between the impeller 56 and the scroll 52 at the main pump side of the impeller, and leakage tends to flow therethrough toward the space 16 between the boost pump and the main pump.

The boost pump delivers fluid through a suitable line indicated at 29 to the inlet 11 of the main pump 10, and the latter discharges at 12. The main pump includes a series of positive displacement chambers 59 circularly spaced about the axis 60 and receiving plungers 61 which are movable generally axially within the chambers in such sequence as to draw fluid into the chambers from the inlet 11 and to discharge the taken-in fluid through porting 62 to the outlet 12. A suitable rotary eccentric device for causing the plungers to work back and forth in the chambers is indicated at 63. the chambered block 67 being driven by the shaft extent 64 through a spline connection 65. Said connection couples to a sleeve 66 which is bounded within and carries the chambered block 67.

The rotary device 63 for operating the plungers 61 is carried by a housing portion 68 through which the shaft extent 64 projects, and it will be understood that leakage of fluid that has become dirty in the system occurs between the shaft extent 64 and the hub 69 of the device 63. Such leakage is shown at 15 within the space 16, and it will also be understood that the leakage originates from the revolving chambers 59 and enters the space 16a in direct communication with the spline 31 to maintain it in lubricated condition.

Referring back to the boost pump, the leakage therefrom indicated at 35 enters the space 16 and has direct lubricating communication with a spline 30 between the shaft extent 64 and the tubular extension 71 of the shaft 32. The extension 71 is pinned at 72 to the impeller structure 73 which is retained on the extension 71 as by a suitable nut 74.

A tubular plug is shown at 75 in the bottom of the casing 76 surrounding the space 16 to drain the low pressure fluid from the space 16 as previously mentioned, fluid withdrawn at 17 through the plug passing through the line 18 previously described.

Figure 3:
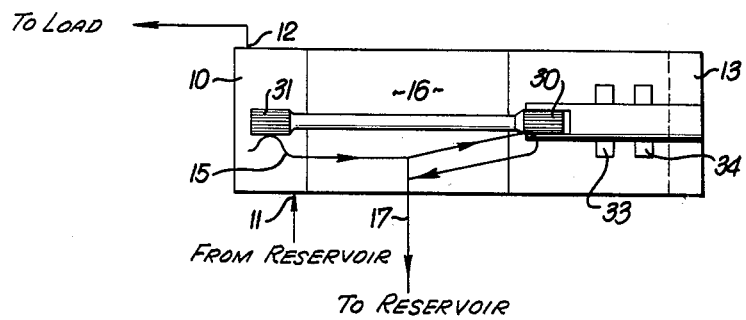
FIG. 3 is a schematic view illustrating a modified form of the invention.

Referring now to FIG. 3, the elements thereof correspond to those shown in FIG. 1 with the exception that the boost pump is now eliminated. Instead, fluid is supplied from the reservoir directly to the main pump 10. The splines 30 and 31 are maintained in lubrication condition by the leakage 15, which fills the space 16 at sufficiently low pressure due to escape at 17 that the danger of contamination of the motor 13 by flow past the seal 34 is practically eliminated.

I claim:

1. In combination, an assembly including a fluid pressure boost pump, a high pressure pump, a rotary electrical motor, a rotary drive for transferring power from said motor to said pumps, means for sealing said drive to prevent fluid access to the motor, the boost pump having a fluid inlet in communication with the pump side of said means opposite the motor interior to maintain said pump side of said means at boost pump inlet pressure, the boost pump connected to discharge fluid to the intake of the high pressure pump, the assembly including housing structure to receive any fluid leaking between relatively moving parts of both pumps and to drain said leaking fluid remotely from said electrical machine, said leaking fluid passing in lubricating proximity to said drive, said drive to said high pressure pump being sufficiently unsealed beyond said means to facilitate said leakage.

2. The combination of claim 1 in which said drive includes rotary shafting having spline connections for transmitting rotation to pump elements, said spline connections being lubricated by said leaking fluid.

3. The combination as defined in claim 1 in which assembly housing structure includes a tubular portion into which the motor shaft projects, said drive sealing means packing off between said motor shaft and said tubular portion of the housing structure, the motor rotor containing passages directed to circulate air immediately outwardly of said tubular portion.

References Cited in the file of this patent

UNITED STATES PATENTS

| | | |
|---|---|---|
| 1,736,002 | Frickey et al. | Nov. 19, 1929 |
| 2,365,309 | Talbot | Dec. 19, 1944 |
| 2,410,973 | Hoover | Nov. 12, 1946 |
| 2,500,226 | Adams | Mar. 14, 1950 |
| 2,900,919 | Anderson et al. | Aug. 25, 1959 |